United States Patent
Hatcher

[15] 3,679,224
[45] July 25, 1972

[54] LIFTING ARRANGEMENT FOR AGRICULTURAL IMPLEMENT FRAME

[72] Inventor: John C. Hatcher, Charlotte, N.C.
[73] Assignee: Cole Manufacturing Company, Charlotte, N.C.
[22] Filed: Feb. 16, 1971
[21] Appl. No.: 115,172

[52] U.S. Cl............................................280/43.23, 172/421
[51] Int. Cl.................................................B62d 21/18
[58] Field of Search...............280/43.23, 6; 180/41; 172/421

[56] References Cited

UNITED STATES PATENTS

| | | |
|---|---|---|
| 3,356,382 | 12/1967 | Fay.....................................280/43.23 |
| 3,410,569 | 11/1968 | Blake..................................280/43.23 |
| 3,486,761 | 12/1969 | Fay.....................................280/43.23 |

Primary Examiner—Benjamin Hersh
Assistant Examiner—Robert R. Song
Attorney—Parrott, Bell, Seltzer, Park & Gibson

[57] ABSTRACT

The frame of an agricultural implement is elevated relative to land traversed by the cooperation of first and second pressure fluid actuators having cylinders of common inside diameter, a pressure fluid circuit connecting the actuators in series, and a pair of lever members having ground engaging wheels mounted thereon. A differential in the stroke of the pressure fluid actuators resulting from the series connection thereof is compensated for by connection of respective actuators at different spaced locations along corresponding lever members.

3 Claims, 5 Drawing Figures

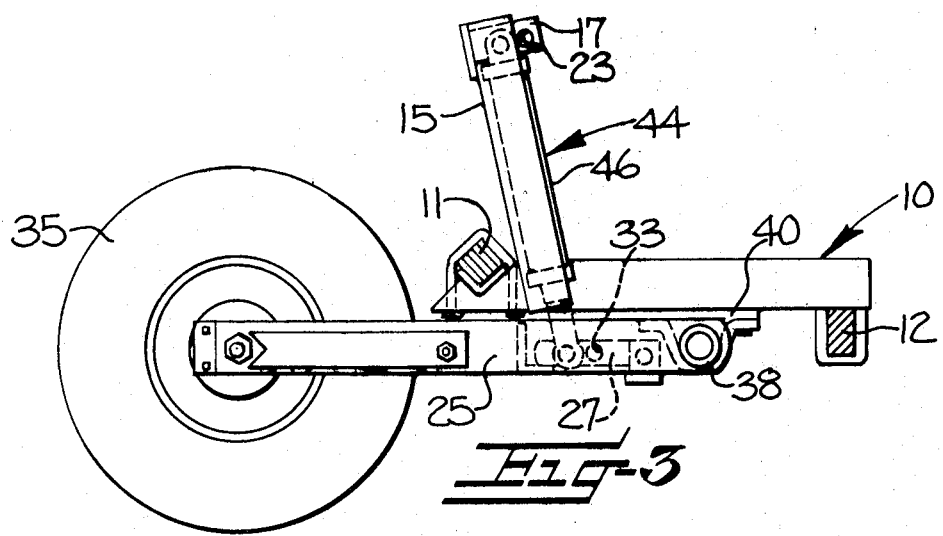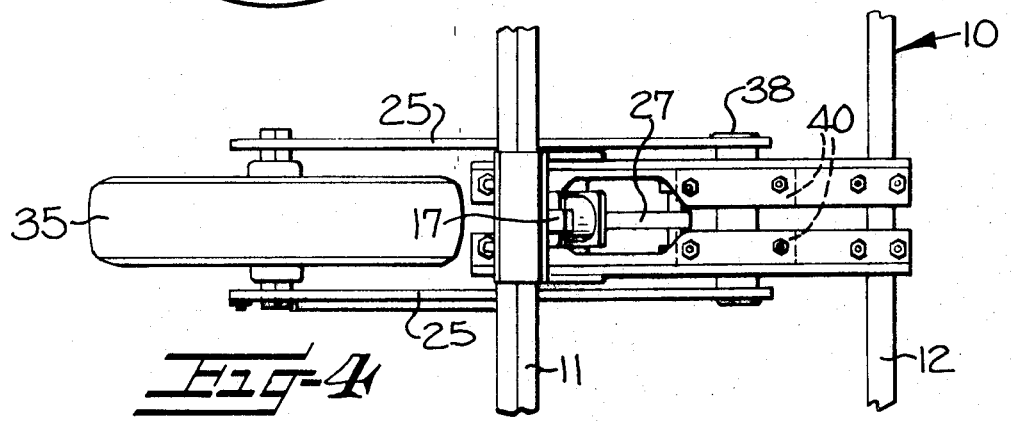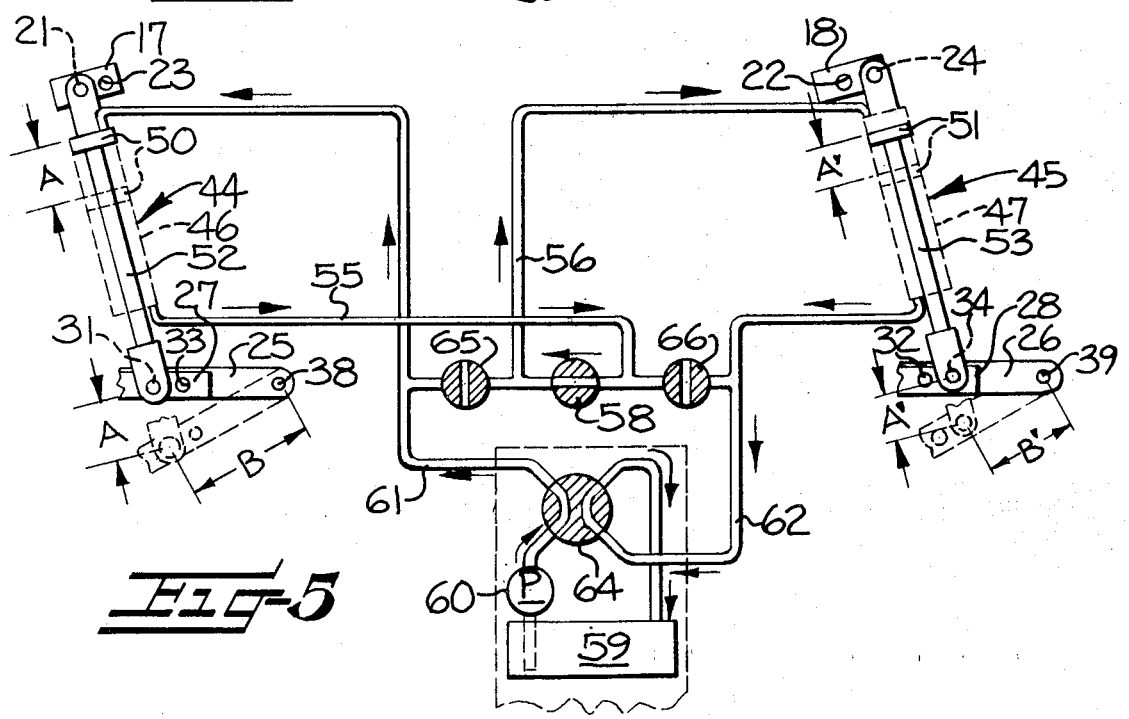

LIFTING ARRANGEMENT FOR AGRICULTURAL IMPLEMENT FRAME

Agricultural implement frames have heretofore been lifted by a power lift arrangement employing a pair of pressure fluid actuators and a pressure fluid circuit for delivering fluid to the actuators. In such arrangements, the desirability of minimizing tilting of a frame during lifting thereof has been recognized, and efforts have been made toward accomplishing such operation by development of arrangements where a slave cylinder having a hydraulic capacity in the cylinder end thereof which is equal to the hydraulic capacity of a piston rod end of a master cylinder is connected in series with the master cylinder to achieve an equal stroke for a pair of fluid actuators. Such previously proposed arrangements suffer from important deficiencies in manufacture and use, as requiring two hydraulic cylinders which not only differ in inside diameter but which differ in a particular predetermined ratio. Thus, the problems of inventory and assembly during manufacture are at least doubled, the erroneous exchange of parts is made possible, and the availability of required parts for field maintenance is complicated.

It is an object of the present invention to achieve the desired result of elevating an agricultural implement frame while minimizing tilting thereof without creating the problems and difficulties typical of prior attempts at such a solution. In accordance with the present invention, pressure fluid cylinders of common inside diameter are employed in an arrangement which accomplishes equal movement of a pair of ground engaging wheels. In realizing the object of this invention, a manufacturer of agricultural implements need stock only a single size of pressure fluid actuator and repairs in the field may be made without specifying which of two different sizes is required.

Some of the objects and advantages of the invention having been stated, others will appear as the description proceeds, when taken in connection with the accompanying drawings, in which FIG. 1 is a perspective view of an agricultural implement embodying the subject invention;

FIG. 3 is an elevation view, from the side, of the agricultural implement elements illustrated in FIG. 2;

FIG. 4 is a plan view of the apparatus illustrated in FIG. 3; and

FIG. 5 is a schematic illustration of a pressure fluid circuit of the arrangement in accordance with the present invention.

Figure 1:
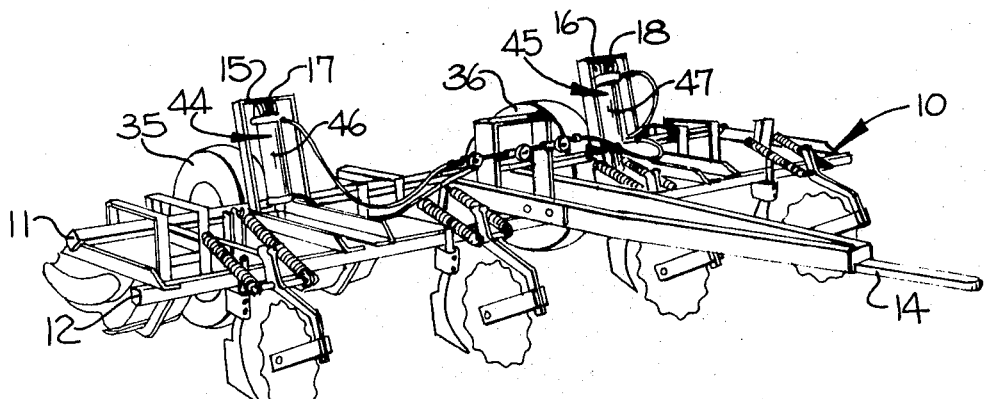
Figure 2:
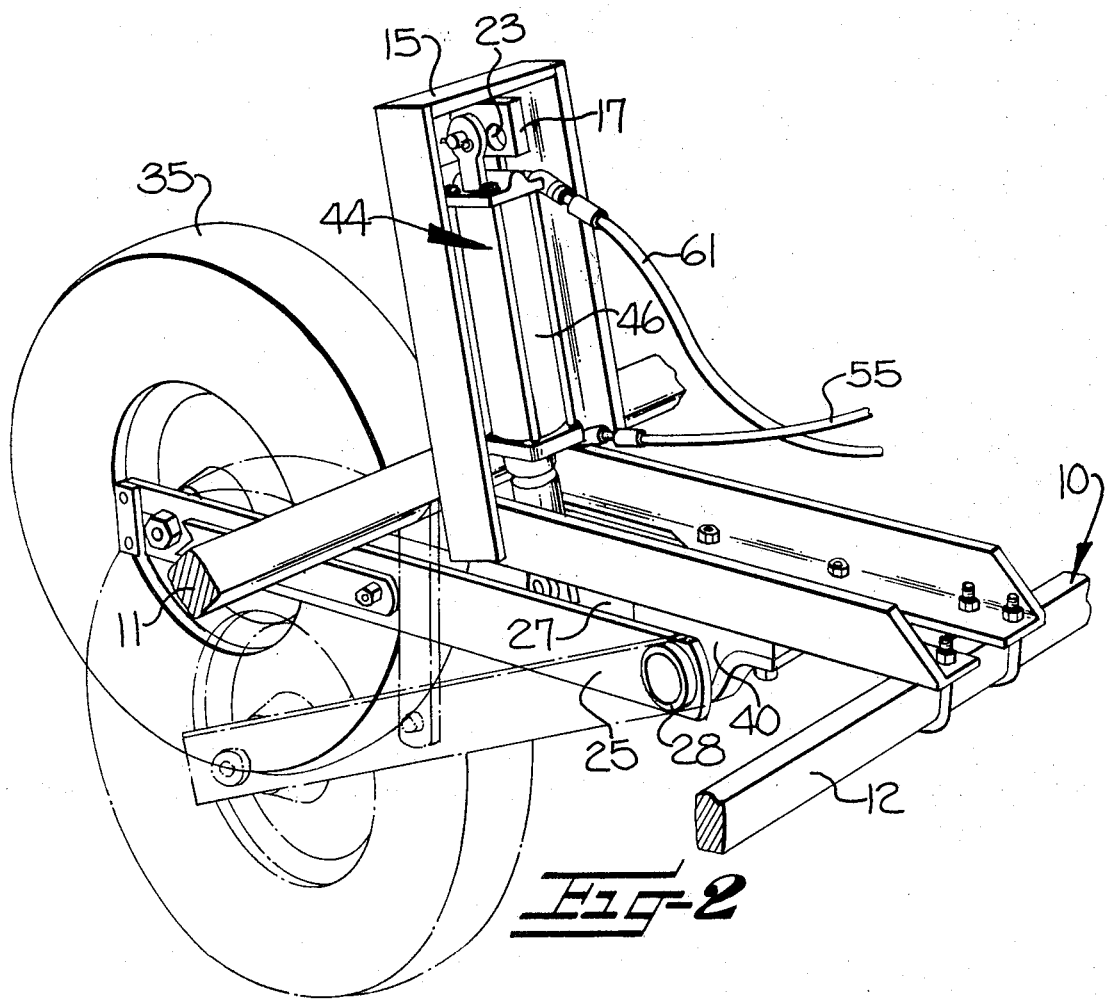
FIG. 2 is an enlarged perspective view of a portion of the implement of FIG. 1 illustrating certain elements of the present invention in greater detail.

In the accompanying drawings, an agricultural implement is generally indicated at 10 (FIG. 1) and includes a main frame having transversely extending bar members 11, 12 and a forwardly extending tongue portion 14 adapted for connection of the agricultural implement 10 to a towing machine such as a tractor or the like. The agricultural implement 10 is not herein disclosed as having a particular specific function, and it is anticipated that a variety of specific operating implements may be mounted from the frame, such as seed planting or cultivator apparatus. For purposes of the present disclosure, it is intended that the agricultural implement 10 be representative of a broad range of implements to which the present subject invention may be applied, in order that the following disclosure will not be limited to any specific arrangement of any such implements.

It is to be noted that the frame of the implement 10 further includes a pair of upstanding actuator brackets 15, 16 each of which includes a corresponding upper actuator connection block 17, 18 (FIGS. 2-5). Each of the upper blocks 17, 18 includes a pair of mounting bores 21, 23, 22, 24 for purposes to be developed more fully hereinafter.

Mounted from the frame of the agricultural implement 10, adjacent the location of the actuator brackets 15, 16 are a pair of lever members 25, 26. Each of the lever members is mounted from the frame for oscillation relative thereto about a pivot axis, carries a lower actuator connection block 27, 28 and mounts a corresponding one of two ground engaging wheels 35, 36. The lower blocks 27, 28 have formed therein a plurality of mounting bores 31, 33, 32, 34.

Tubular cross-members 38, 39 at the forward extremity of each of the lever members 25, 26 extend through bearing blocks 40, 41 on the implement frame, to define pivot axes for the lever members 25, 26. Desirably, the arrangement of the frame of the agricultural implement 10 is such that the pivot axes defined by the tubular cross-members 38, 39 and bearing blocks 40, 41 are substantially aligned. Further, it is desirable for interchangeability of elements of the implement to have the ground engaging wheels 35, 36 mounted for rotation about rotational axes spaced at equal distances from the lever member pivot axes.

In accordance with the present subject invention, the frame of the agricultural implement is elevated relative to land traversed, while tilting of the frame during elevation is minimized, by the provision of first and second pressure fluid actuator means 44, 45 for moving the lever members 25, 26 in oscillation and thereby for raising and lowering the frame. As has been briefly pointed out above, each of the actuator means 44, 45 includes a pressure fluid cylinder, respectively identified as the cylinders 46, 47. Within corresponding cylinders 46, 47 are located pistons 50, 51 to which corresponding piston rods 52, 53 operatively connected for extension relative to the corresponding cylinders. As has been briefly pointed out hereinabove, the cylinders 46, 47 are of a common inside diameter. Further, and in accordance with the present subject invention, it is contemplated that the first and second pressure fluid actuator means 44, 45 be fully interchangeable one with another, in order to gain the advantages of simplified inventory, assembly and maintenance which result from the present subject invention.

As schematically illustrated in FIG. 5, pressure fluid circulating means are provided for supplying fluid under pressure to the actuator means 44, 45. The circulating means includes conduit means connecting the second actuator means 45 in series with the first actuator means 44, herein illustrated as a first connecting conduit 55, a second connecting conduit 56, and a connecting valve 58. With the valve 58 in open position, to permit communication between the first and second conduits 55, 56, fluid displaced from the piston rod end of the first actuator means 44 flows through the conduit 55, 56 and valve 58 to the cylinder end of the second actuator means 45 on extension of the piston rod 52 of the first actuator means 44.

It will be noted that the hydraulic capacity of the piston rod end of the first actuator 44, during a full length stroke of the first piston rod 52, will not displace such a quantity of hydraulic fluid as will cause the second piston rod 53 to move to a fully extended position. Instead, the stroke of the second piston rod 53 is less than the stroke of the first piston rod 52, by a ratio of the comparative hydraulic capacity volumes.

In accordance with the present subject invention, movement of the ground engaging wheels 35, 36 relative to the frame of the agricultural implement 10 is equalized notwithstanding the inequality in strokes of the actuator means 44, 45, through operative connection of the actuator means 44, 45 in a particular manner. Each of actuator means 44, 45 is connected between corresponding pairs of upper blocks 17, 18 and lower blocks 27, 28. In the portion of the implement 10 particularly illustrated in FIGS. 2–4, the first actuator 44 is illustrated particularly as mounted between an upper block 17 carried by an actuator bracket 15 and a lower block 27 carried by the first lever member 25. Further, it is to be noted that the actuator 44 is operatively connected in this manner through the means of pins passing through the rearward mounting bores 21, 31, in the respective blocks 17, 27. Thus, connection of the first actuator means to the corresponding lever member 25 and actuator bracket 15 positions the first actuator means 44 to act at a predetermined distance spaced between the pivot axis defined by the corresponding bearing block 40 and tubular cross-member 38 and the rotational axis of the corresponding wheel 35.

As will be noted from FIG. 5, the second actuator means 45 is mounted in the other of the available mounting bores 24, 34, of the corresponding blocks 18, 28 or, in the particular orientation illustrated, the forward mounting bores instead of the rearward mounting bores. By such connection, the location at which the second actuator means 45 acts on the corresponding lever member 26 is spaced from the corresponding pivot axis a distance less than the distance described above with reference to the first actuator means 44.

In order to equalize the movement of the wheels 35, 36 relative to the frame of the implement 10, the difference in strokes of the first and second actuator means 44, 45 and the difference in connection thereof as briefly described bear a particular relationship. This relationship has been schematically identified in FIG. 5, where the comparative strokes of the actuator means have been identified by the reference characters A, A' and the comparative lever arms at which the actuator means act have bee identified by the reference characters B, B'. In ratio, A/B is substantially equal to A'/B'.

Such equality of ratios, together with a substantial alignment of the pivot and rotational axes, results in displacement of the lever members 25, 26 through a common angle of movement on extension and retraction of the first piston rod 52.

It is further to be noted that the actuator means 44, 45 are mounted for movement of the piston rods 52, 53 along parallel lines, with each of the lines of piston rod movement extending substantially perpendicular to a line bisecting the angle defined by the positions of the corresponding lever members 25, 26 when the piston rods 52, 53 are retracted and the positions of the lever members when the piston rods are extended. Such parallel action along tangent lines further assures equality of movement of the wheels 25, 26.

The pressure fluid circulating means of FIG. 5 additionally provides means for ready filling of the hydraulic lines and cylinders from a reservoir 59 and by means of a pump 60, both of which are conventional on towing machines with which the implement 10 is used. As illustrated, tractor coupling conduits 61, 62 provide operative communication between the pump 60, reservoir 59 and actuators 44, 45. A reversing valve 64 permits interconnection for raising or lowering the frame of the implement. By means of filling valves 65, 66, communication of the first and second connecting conduits 55, 56 with the coupling conduits 61, 62 is controlled for admitting pressure fluid to and trapping such fluid in the first and second conduits 55, 56.

In particular, when the conduits are to be filled, the connecting valve 58 is closed and filling valves 65, 66 are opened. The pump 60 and reversing valve 64 are then used to cycle the actuators 44, 45 repeatedly, until the connecting conduits 55, 56 are filled. The filling valves 65, 66 are then closed and connecting valve 58 is opened to provide operation as disclosed above.

In the drawings and specification, there has been set forth a preferred embodiment of the invention, and although specific terms are employed, they are used in a generic and descriptive sense only and not for purposes of limitation.

That which is claimed is:

1. In an agricultural implement having a frame, a pair of lever members each mounted from said frame for oscillation relative thereto about a pivot axis, and a pair of ground engaging wheels each mounted on a corresponding one of said lever members for rotation about a rotational axis spaced a predetermined distance from said pivot axis, the combination therewith of means for elevating the frame relative to land traversed and for minimizing tilting of said frame during elevation, said means comprising:

first and second pressure fluid actuator means for moving said lever members in oscillation and thereby for raising said frame upwardly, said first and second actuator means including first and second cylinders of common inside diameter, first and second pistons movable within corresponding ones of said cylinders, and first and second piston rods operatively connected to corresponding pistons and extensible relative to corresponding cylinders, and pressure fluid circulating means for supplying fluid under pressure to said actuator means, said circulating means including conduit means connecting said second actuator means in series with said first actuator means for displacement of fluid from the piston rod end of said first actuator means to the cylinder end of said second actuator means on extension of said piston rods whereby the stroke of said second piston rod is less than the stroke of said first piston rod, said first and second actuator means each being connected between said frame and a corresponding one of said lever members for pivoting said lever members on extension and retraction of said piston rods and with the connection of said second actuator means to said corresponding lever member being spaced from said corresponding pivot axis a distance less than the distance between the connection of said first actuator means to said corresponding lever member and said corresponding pivot axis whereby the movement of said wheels relative to said frame is equalized notwithstanding the inequality in strokes of said actuators means.

2. The combination of claim 1 wherein said pivot axes and said rotational axes are substantially aligned and said actuator means are connected with said lever members for displacing said lever members through a common angle of movement on extension and retraction of said first piston rod.

3. The combination of claim 1 wherein said actuator means are mounted for movement of said piston rods along parallel lines, each of said lines of piston rod movement extending substantially perpendicular to a line bisecting an angle defined by the position of said corresponding lever member when said corresponding piston rod is retracted and the position of said corresponding lever member when said corresponding piston rod is extended.

* * * * *